US012627468B2

(12) United States Patent

Kurdziel et al.

(10) Patent No.: US 12,627,468 B2

(45) Date of Patent: May 12, 2026

(54) SYSTEMS AND METHODS FOR PROVIDING SUBSTITUTION BOXES

(71) Applicant: L3Harris Global Communications, Inc., Melbourne, FL (US)

(72) Inventors: Michael Kurdziel, Rochester, NY (US); Steven Farris, Webster, NY (US); Alan Kaminsky, Rochester, NY (US); Peter Bajorski, Fairport, NY (US); Payton Burak, Jamison, PA (US); Marcin Lukowiak, Rochester, NY (US); Stanislaw Radziszowski, West Henrietta, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 251 days.

(21) Appl. No.: 18/533,853

(22) Filed: Dec. 8, 2023

(65) Prior Publication Data

US 2025/0192984 A1     Jun. 12, 2025

(51) Int. Cl.
| | |
|---|---|
| *H04L 9/00* | (2022.01) |
| *G06F 1/03* | (2006.01) |
| *G06F 17/16* | (2006.01) |
| *H04L 9/06* | (2006.01) |

(52) U.S. Cl.
CPC .............. *H04L 9/0631* (2013.01); *G06F 1/03* (2013.01); *G06F 17/16* (2013.01)

(58) Field of Classification Search
CPC .......... H04L 9/0631; G06F 1/03; G06F 17/16
See application file for complete search history.

(56) References Cited

U.S. PATENT DOCUMENTS

| | | | | |
|---|---|---|---|---|
| 10,666,437 | B2* | 5/2020 | Kurdziel | H04L 9/0631 |
| 2014/0198913 | A1* | 7/2014 | Rose | H04L 9/0816 |
| | | | | 380/44 |
| 2016/0269175 | A1* | 9/2016 | Cammarota | H04L 9/002 |

OTHER PUBLICATIONS

Anandakumar et al., "A Very Compact FPGA Implementation of LED and PHOTON," Advances in Visual Computing: 16th International Symposium, ISVC 2021, Virtual Event, Oct. 4-6, 2021, Proceedings, Part II; (Lecture Notes in Computer Science), Springer International Publishing, pp. 304-321 (2014).

Avanzi, "A Salad of Block Ciphers: The State of the Art in Block Ciphers and their Analysis," IACR, International Association for Cryptologic Research, vol. 20161228, 296 pages (2016).

(Continued)

*Primary Examiner* — Syed M Ahsan

(74) *Attorney, Agent, or Firm* — Fox Rothschild LLP; Carol E. Thorstad-Forsyth

(57)     ABSTRACT

Systems and methods for providing an S-box. The methods comprise: implementing a plurality of layers on a field programmable gate array, wherein each of the layers comprises a substitution sublayer and a mixing sublayer. The substitution sublayer comprises a plurality of μ-boxes that are each configured to perform a different randomly chosen non-linear bijective mapping from $GF(2^4)$ to $GF(2^4)$. The mixing sublayer is configured to (i) compute a plurality of product terms each representing a product of an element of a maximum distance separable matrix M and an output from one of the plurality of μ-boxes, and (ii) compute a plurality of column vector elements each comprising a sum of respective ones of the plurality of product terms.

20 Claims, 9 Drawing Sheets

(56) References Cited

OTHER PUBLICATIONS

Bogdanov and Shibutani, "Generalized Feistel networks revisited," Des. Codes Cryptogr., 66, pp. 75-97 (2013).

Bajorski et al., "Array-Based Statistical Analysis of the MK-3 Authenticated Encryption Scheme," MILCOM 2018—2018 IEEE Military Communications Conference (MILCOM), Los Angeles, CA, USA, pp. 1-9 (2018).

Bajorski et al., "Customization Modes for the Harris MK-3 Authenticated Encryption Algorithm," MILCOM 2018—2018 IEEE Military Communications Conference (MILCOM), Los Angeles, CA, USA, pp. 1-5 (2018).

Bajorski et al., "Statistical Analysis of the MK-3 Customizable Authenticated Encryption," MILCOM 2022 Track 3—Cyber Security and Trusted Computing, pp. 974-979 (2022).

Fitzgerald et al., "FPGA-Based, Multi-Processor HW-SW System for Single-Chip Crypto Applications," Proc. IEEE, Mil. Comm. Conf., Oct. 2010, 6 pages.

Kelly et al., "Customizable Sponge-Based Authenticated Encryption Using 16-bit S-boxes," MILCOM 2015—2015 IEEE Military Communications Conference, Tampa, FL, USA, pp. 43-48 (2015).

Matsui, "Linear Cryptanalysis Method for DES Cipher," T. Helleseth (Ed.): Advances in Cryptology—EUROCRYPT '93, LNCS 765, pp. 386-397, (1994).

Mishra et al., "Efficient hardware mapping of Boolean substitution boxes based on functional decomposition for RFID and ISM band IoT applications," INTEGRATION, the VLSI journal 92, pp. 38-47 (2023).

Prathiba et al., "Hardware footprints of S-box in lightweight symmetric block ciphers for IoT and CPS information security systems," Integration, the VLSI Journal 69, pp. 266-278 (2019).

Rashidi, "Compact and efficient structure of 8-bit S-box for lightweight cryptography," INTEGRATION, the VLSI journal 76, pp. 172-182 (2021).

Sawada et al., "Logic Synthesis for Look-Up Table based FPGAs using Functional Decomposition and Support Minimization," Proceedings of IEEE International Conference on Computer Aided Design (ICCAD), San Jose, CA, USA, pp. 353-358 (1995).

Werner et al., "Fully Parallel Implementation of the MK-3 Authenticated Encryption Algorithm on FPGA," New York Cyber Security and Engineering Technology Association (NYSETA) Conf., Rochester, NY, Oct. 2015, 7 pages.

Werner et al., "Implementing Authenticated Encryption Algorithm MK-3 on FPGA," Milcom 2016 Track 3—Cyber Security and Trusted Computing, pp. 1-6 (2016).

Youssef et al., "On the Design of Linear Transformations for Substitution Permutation Encryption Networks," Fourth Annual Workshop on Selected Areas in Cryptography (SAC '97), pp. 40-48 (1997).

* cited by examiner

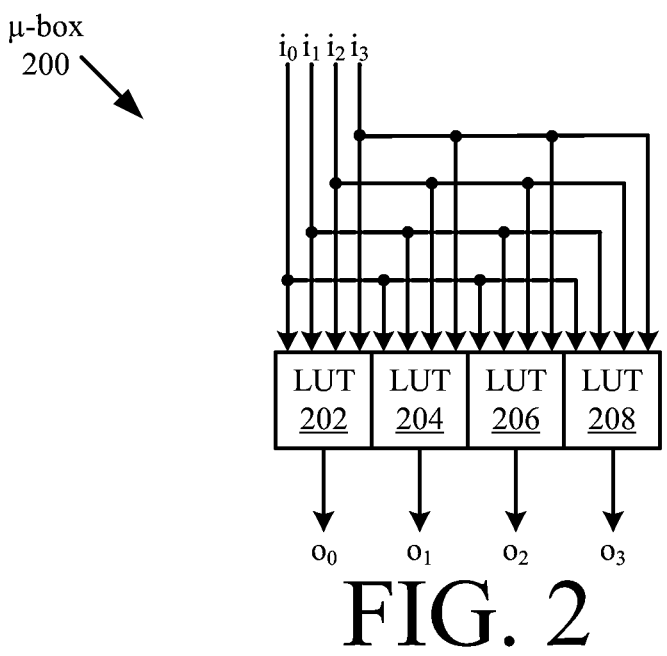

$\mu$-box
200

$i_0$ $i_1$ $i_2$ $i_3$

| LUT 202 | LUT 204 | LUT 206 | LUT 208 |

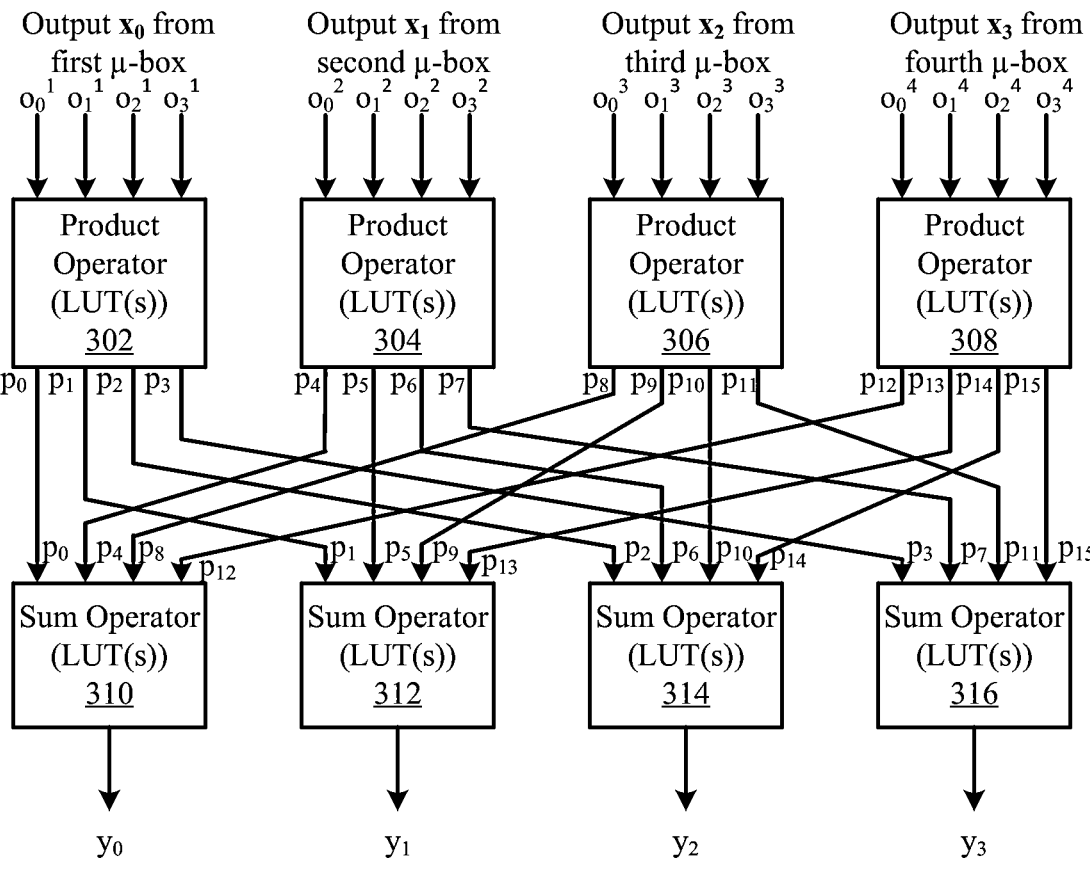

Output $x_0$ from first $\mu$-box
$o_0^1$ $o_1^1$ $o_2^1$ $o_3^1$

Output $x_1$ from second $\mu$-box
$o_0^2$ $o_1^2$ $o_2^2$ $o_3^2$

Output $x_2$ from third $\mu$-box
$o_0^3$ $o_1^3$ $o_2^3$ $o_3^3$

Output $x_3$ from fourth $\mu$-box
$o_0^4$ $o_1^4$ $o_2^4$ $o_3^4$

| Product Operator (LUT(s)) 302 | Product Operator (LUT(s)) 304 | Product Operator (LUT(s)) 306 | Product Operator (LUT(s)) 308 |

$p_0$ $p_1$ $p_2$ $p_3$     $p_4$ $p_5$ $p_6$ $p_7$     $p_8$ $p_9$ $p_{10}$ $p_{11}$     $p_{12}$ $p_{13}$ $p_{14}$ $p_{15}$ $p_0$ $p_4$ $p_8$ $p_{12}$     $p_1$ $p_5$ $p_9$ $p_{13}$     $p_2$ $p_6$ $p_{10}$ $p_{14}$     $p_3$ $p_7$ $p_{11}$ $p_{15}$

| Sum Operator (LUT(s)) 310 | Sum Operator (LUT(s)) 312 | Sum Operator (LUT(s)) 314 | Sum Operator (LUT(s)) 316 |

Crypto
Development Kit
400

Plaintext
402

Field Programmable Gate Array 404

Confusion Layer 408
(e.g., S-boxes with first configuration)

Diffusion Layer 410
(e.g., first random permutation)

Optional Round(s)
with different
input(s)

Confusion Layer 412
(e.g., S-boxes with second different configuration)

Diffusion Layer 414
(e.g., different second random permutation)

Ciphertext
406

900

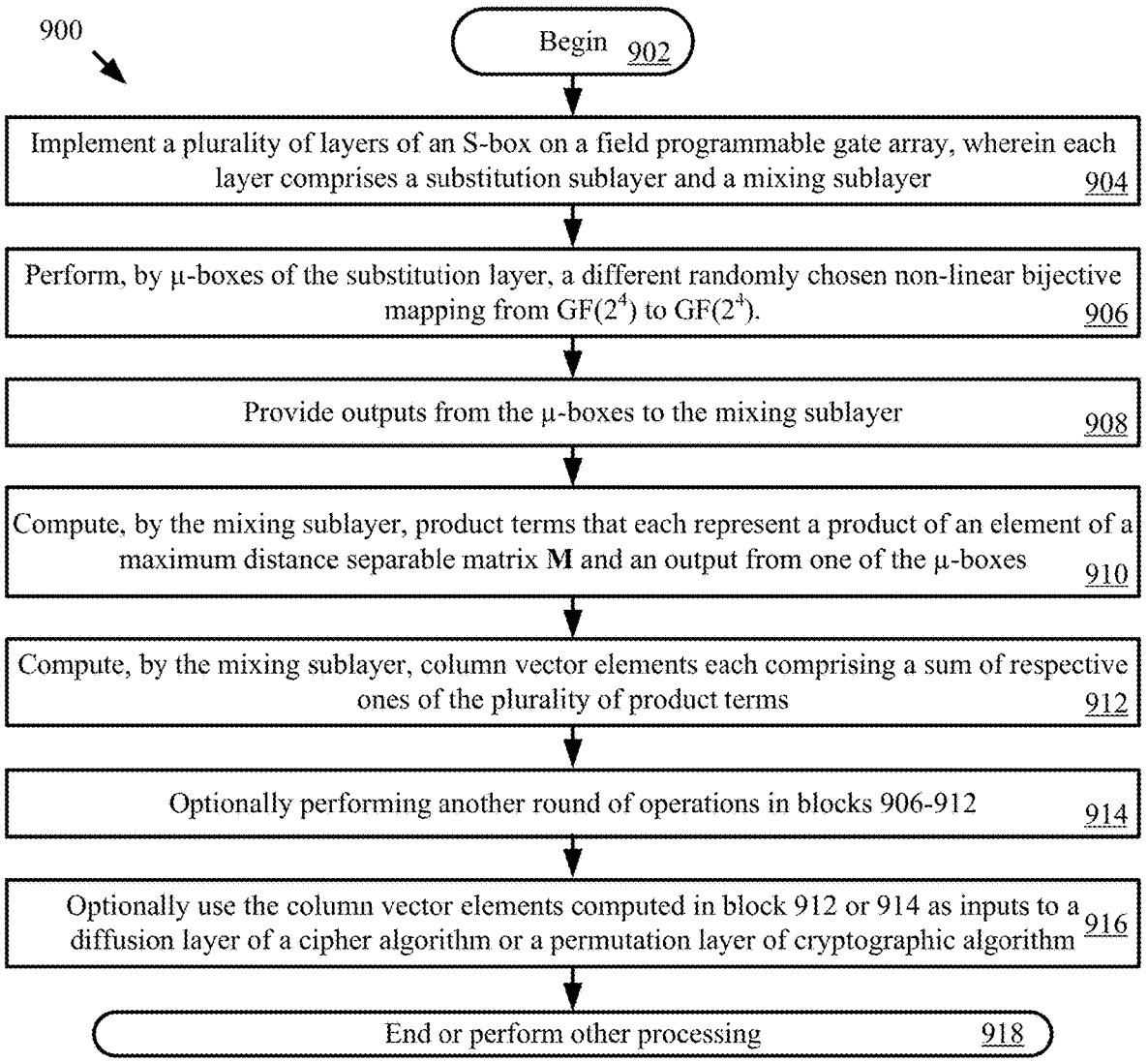

Begin 902

Implement a plurality of layers of an S-box on a field programmable gate array, wherein each layer comprises a substitution sublayer and a mixing sublayer 904

Perform, by μ-boxes of the substitution layer, a different randomly chosen non-linear bijective mapping from $GF(2^4)$ to $GF(2^4)$. 906

Provide outputs from the μ-boxes to the mixing sublayer 908

Compute, by the mixing sublayer, product terms that each represent a product of an element of a maximum distance separable matrix M and an output from one of the μ-boxes 910

Compute, by the mixing sublayer, column vector elements each comprising a sum of respective ones of the plurality of product terms 912

Optionally performing another round of operations in blocks 906-912 914

Optionally use the column vector elements computed in block 912 or 914 as inputs to a diffusion layer of a cipher algorithm or a permutation layer of cryptographic algorithm 916

End or perform other processing 918

FIG. 9

SYSTEMS AND METHODS FOR PROVIDING SUBSTITUTION BOXES

BACKGROUND

Description of the Related Art

Crypto development kits (CDKs) allow users to generate sovereign cipher designs by forming the cipher using a series of predefined building blocks, testing the cipher, and synthesizing a hardware image. The predefined building blocks of conventional CDKs are often not suitable for implementation on field programmable gate arrays (FP-GAs).

SUMMARY

This document concerns systems and methods for providing an S-box. The methods comprise implementing a plurality of layers on a field programmable gate array, wherein each of the layers comprises a substitution sublayer and a mixing sublayer. The substitution sublayer comprises a plurality of p-boxes that are each configured to perform a different randomly chosen non-linear bijective mapping from $GF(2^4)$ to $GF(2^4)$. The mixing sublayer is configured to (i) compute a plurality of product terms each representing a product of an element of a maximum distance separable matrix M and an output from one of the plurality of p-boxes, and (ii) compute a plurality of column vector elements each comprising a sum of respective ones of the plurality of product terms.

The S-box is configured to meet the following requirements: no fixed points where $S(x)=x$; and no opposite fixed points where $S(x)=$bitwise complement of x. Each of said $\mu$-boxes is configured to meet the following requirements: no fixed points where $\mu(x)=x$; no opposite fixed points where $\mu(x)=$bitwise complement of x; maximum differential probability of 4/16 or smaller; and maximum absolute linear bias of 4/16 or smaller.

In some scenarios, the plurality of layers may comprise four layers. The plurality of $\mu$-boxes may comprise four $\mu$-boxes with a 4-bit input and a 1-bit output. Each $\mu$-box may be implemented via at least four look-up tables of the field programmable gate array. The product terms may be computed by product operators that are each implemented via at least two lookup tables of the field programmable gate array. Each of the product operators may be implemented via four lookup tables of the field programmable gate array.

In those or other scenarios, each element of the maximum distance separable matrix M, the output of each of the $\mu$-boxes, and each of the column vector elements comprises an element in a finite field $GF(2^4)/f(x)$, wherein $f(x)$ is a degree-4 irreducible polynomial. The methods further comprise performing a plurality of rounds of the mixing sublayer using a different randomly chosen maximum distance separable matrix and a different randomly chosen irreducible polynomial.

The present document also concerns an S-box. The S-box comprises a field programmable gate array implementing a plurality of layers that each comprises a substitution sublayer and a mixing sublayer. The substitution sublayer comprising a plurality of $\mu$-boxes that are each configured to perform a different randomly chosen non-linear bijective mapping from $GF(2^4)$ to $GF(2^4)$. The mixing sublayer is configured to (i) compute a plurality of product terms each representing a product of an element of a maximum distance separable matrix M and an output from one of the plurality of $\mu$-boxes, and (ii) compute a plurality of column vector elements each comprising a sum of respective ones of the plurality of product terms.

The S-box is configured to meet the following requirements: no fixed points where $S(x)=x$; and no opposite fixed points where $S(x)=$bitwise complement of x. Each of the $\mu$-boxes is configured to meet the following requirements: no fixed points where $\mu(x)=x$; no opposite fixed points where $\mu(x)=$bitwise complement of x; maximum differential probability of 4/16 or smaller; and maximum absolute linear bias of 4/16 or smaller.

In some scenarios, the plurality of layers may comprise four layers. The plurality of $\mu$-boxes may comprise four $\mu$-boxes with a 4-bit input and a 1-bit output. Each $\mu$-box may be implemented via at least four look-up tables of the field programmable gate array.

The product terms may be computed by product operators that are each implemented via at least two lookup tables of the field programmable gate array. Each product operator may be implemented via four lookup tables of the field programmable gate array.

Each element of the maximum distance separable matrix M, the output of each of said $\mu$-boxes, and each of said column vector elements may comprise an element in a finite field $GF(2^4)/f(x)$, wherein $f(x)$ is a degree-4 irreducible polynomial. Each of a plurality of rounds of the mixing sublayer uses a different randomly chosen maximum distance separable matrix and a different randomly chosen irreducible polynomial.

BRIEF DESCRIPTION OF THE DRAWINGS

This disclosure is facilitated by reference to the following drawing figures, in which like numerals represent like items throughout the figures.

FIG. 2 provides an illustration of a $\mu$-box.

FIG. 3 provides an illustration of a mixing sublayer.

FIG. 9 provides a flow diagram of an illustrative method for generating encrypted data.

DETAILED DESCRIPTION

Figure 1:
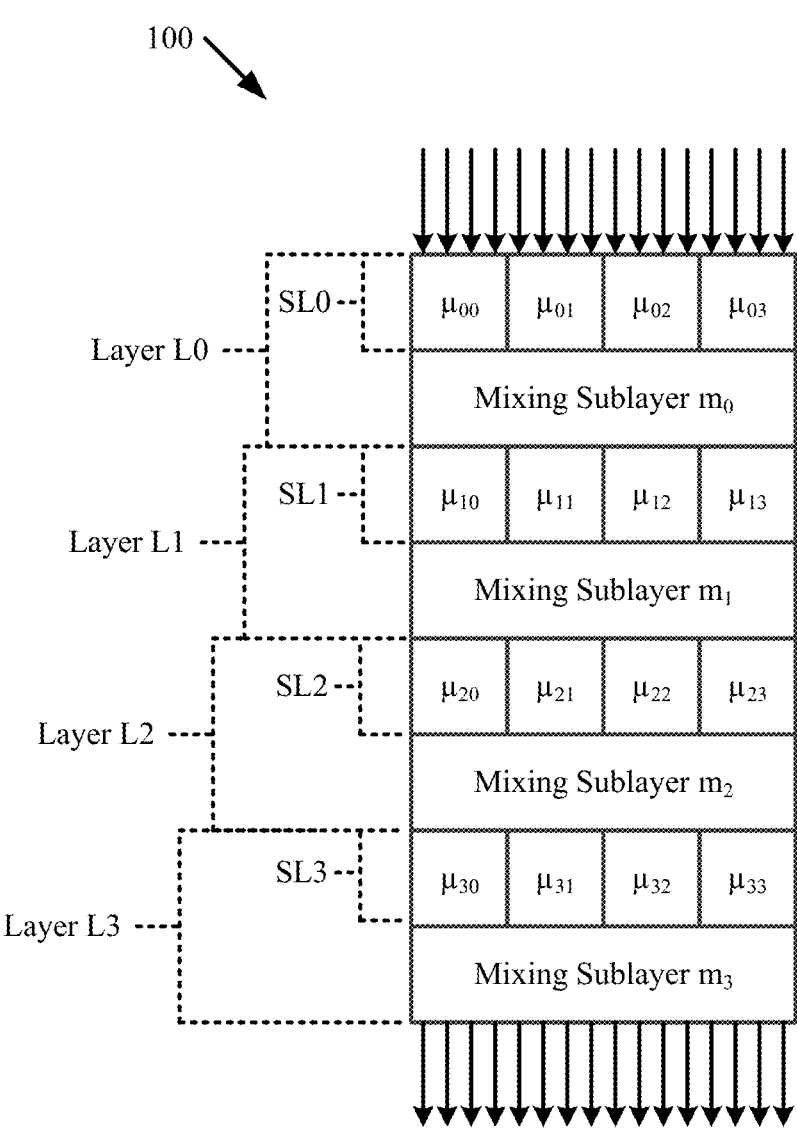
FIG. 1 shows an S-box in accordance with the present solution.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

CDKs may be used to design systems implementing cryptographic algorithms. Some cryptographic algorithms may be characterized as Product Ciphers and can include, but are not limited to, confusion (or substitution) layers and diffusion layers. Each confusion (or substitution) layer comprises S-boxes implementing non-linear binary mapping functions to map input bits to output bits. Each diffusion layer performs a random permutation to rearrange the bits output from the S-boxes.

Large scale S-boxes are defined as those with input and output spaces that are larger than eight bits. Given that cipher may be targeted for hardware implementation in a field programmable gate array (FPGA), the pre-defined building blocks of the present solution are designed with FPGA characteristics in mind. Implementing large scale S-boxes with FPGAs is challenging. In an FPGA of the present solution, S-boxes are rendered using logic cells. A logic cell consists of one or a few look-up tables (LUTs) as well as flip-flops, multiplexers, and other circuitry. Typical FPGA chips provide LUTs with four inputs, five inputs, or six inputs. Implementation of large-scale S-boxes with these resource constraints requires an innovative approach.

Conventional solutions do not support system objectives for being (1) user specifiable, customizable and/or configurable and (2) synthesizable to an image that is suitable for platform target FPGAs. Such conventional solutions include: an application specific integrated circuit (ASIC) implementation; an inefficient software or hardware implementation requiring either more computational resources or resulting in a negative performance impact; and a hardwired design that cannot accommodate any customization or configuration.

FIG. 1 shows an S-box 100 in accordance with the present solution. S-box 100 is designed for FPGA implementation. An FPGA consists of a large number of logic cells. A logic cell consists of one or a few LUTs as well as flip-flops, multiplexers, and other circuitry. An LUT can be configured to compute any n-input-to-1-output Boolean function, where the number of inputs n is a characteristic of the particular FPGA chip. Typical FPGA chips provide LUTs with 4, 5, or 6 inputs. S-box 100 is described herein as 16-bit S-box, targeted to FPGA chips with 4-input LUTs. The present solution is not limited in this regard.

The 16-bit S-box 100 uses a "micro-cipher" design. The S-box 100 is not intended to be a stand-alone cipher. Rather, the S-box 100 is intended to be part of the confusion layer or substitution layer in some actual block cipher or other cryptographic algorithm. Thus, the S-box 100 does not have to include features, like a key schedule, that would be found in the outer block cipher. The S-box 100 is designed to meet the following requirements: no fixed points where $S(x)=x$; and no opposite fixed points where $S(x)=$bitwise complement of x.

The S-box 100 includes four layers L0, L1, L2 and L3. The present solution is not limited to four layers. Any number of layers can be employed in accordance with a given application. Four layers may be considered a minimal number of layers to provide an efficient S-box process implemented on an FPGA with LUTs with 4-inputs. Each layer consists of a substitution sublayer SL0, SL1, SL2, SL3 and a mixing sublayer $m_0$, $m_1$, $m_2$, $m_3$. This design enables a large scale S-box to be implemented with multiple layers of small components and is suitable to the resource constraints of FPGA technology. In FIG. 1, the illustrated design comprises a 16-bit large scale S-box. The present solution is not limited to this 16-bit large scale S-box design.

Each substitution layer comprises multiple nonlinear micro substitution boxes, which are referred to herein as μ-boxes. For example, substitution layer SL0 comprises four μ-boxes $\mu_{00}$, $\mu_{01}$, $\mu_{02}$, $\mu_{03}$. Substitution layer SL1 comprises four μ-boxes $\mu_{10}$, $\mu_{11}$, $\mu_{12}$, $\mu_{13}$. Substitution layer SL2 comprises four μ-boxes $\mu_{20}$, $\mu_{21}$, $\mu_{22}$, $\mu_{23}$. Substitution layer SL3 comprises four μ-boxes $\mu_{30}$, $\mu_{31}$, $\mu_{32}$, $\mu_{33}$. Thus, there are a total of sixteen μ-boxes. The present solution is not limited in this regard. Each substitution sublayer SL0, SL1, SL2, SL3 can be any number of μ-boxes wide, i.e., include any number of μ-boxes selected in accordance with a particular application. Four μ-boxes per substitution layer may be considered a minimal number to provide an efficient S-box implementation using current FPGA technology providing LUTs with 4-inputs.

Each μ-box performs a different randomly chosen nonlinear bijective mapping from $GF(2^4)$ to $GF(2^4)$, subject to the following requirements: no fixed points, where $\mu(x)=x$; no opposite fixed points, where $\mu(x)=$bitwise complement of x; maximum differential probability of 4/16 or smaller; and maximum absolute linear bias of 4/16 or smaller.

Each mixing sublayer performs a linear transformation based on a maximum distance separable (MDS) matrix. For example, let $x=[x_0, x_1, x_2, x_3]^T$ be a column consisting of the outputs of the four μ-boxes in the substitution layer. If M is a 4×4 MDS matrix, then $y=[y_0, y_1, y_2, y_3]^T=M \cdot x$ is a column vector containing the outputs of the mixing sublayer. Each element of M, x and y is treated as an element of the finite field $GF(24)/f(x)$, where $f(x)$ is a degree-4 irreducible polynomial and the matrix product is computed using arithmetic in this finite field. A list of the degree-4 irreducible polynomials is provided below.

$$x^4 + x + 1$$

$$x^4 + x^3 + 1$$

$$x^4 + x^3 + x^2 + 1$$

Each S-box round may use a different randomly chosen MDS matrix and a different randomly chosen irreducible polynomial.

A 4×4 MDS matrix can be constructed as follows. Let $a_0$, $a_1$, $a_2$, $a_3$, $b_0$, $b_1$, $b_2$ and $b_3$ be eight distinct non-zero filed elements. If M is the Cauchy matrix constructed from the $a_i$ and $b_j$ values. That is, $M_{ij}=(a_i+b_j)^{-1}$, then M is an MDS matrix. The MDS matrix has the property that when one or more of the values are changed in the input vector x, the number of values that change in the output vector y, plus the number of values changed in x, is at least n+1. n is the matrix dimension. In the present case, if one input is changed, then all four outputs change.

FIG. 2 provides an illustration of a μ-box 200 with an architecture for an FPGA implementation providing LUTs with 4-inputs. Each μ-box $\mu_{00}$, $\mu_{01}$, $\mu_{02}$, $\mu_{03}$, $\mu_{10}$, $\mu_{11}$, $\mu_{12}$, $\mu_{13}$, $\mu_{20}$, $\mu_{21}$, $\mu_{22}$, $\mu_{23}$, $\mu_{30}$, $\mu_{31}$, $\mu_{32}$, $\mu_{33}$ of FIG. 1 is the same as or similar to μ-box 200. Thus, the discussion of μ-box 200 is sufficient for understanding the u-boxes of FIG. 1.

The μ-box 200 is implemented in an FPGA with at least four 4-input LUTs 202, 204, 206, 208. Each LUT uses the four input bits $i_0$, $i_1$, $i_2$, $i_3$ to obtain an output bit $o_0$, $o_1$, $o_2$ or $o_3$. Each LUT comprises an array that replaces a computation with an indexing operation. The input bits $i_0$, $i_1$, $i_2$, $i_3$ are used as an index to obtain a data item being looked up. The data item comprises an actual value resulting from the computation.

FIG. 3 provides an illustration of a mixing sublayer 300. Mixing sublayers $m_0$, $m_1$, $m_2$, $m_3$ of FIG. 1 are the same as or similar to mixing sublayer 300. Thus, the discussion of mixing sublayer 300 is sufficient for understanding the mixing sublayers of FIG. 1.

Mixing sublayer 300 is configured to compute a product P of a 4×4-element matrix M and a 4-element vector x using GF($2^4$) arithmetic, yielding a 4-element vector y ($y_0$, $y_1$, $y_2$, $y_3$). The matrix M can be defined, for example, by the following mathematical equation (1).

$$M = \begin{bmatrix} M_0 & M_1 & M_2 & M_3 \\ M_4 & M_5 & M_6 & M_7 \\ M_8 & M_9 & M_{10} & M_{11} \\ M_{12} & M_{13} & M_{14} & M_{15} \end{bmatrix} \tag{1}$$

The vector x is defined by the following mathematical equation (2).

$$x = [x_0, x_1, x_2, x_3] \tag{2}$$

The product P is computed by product operators 302, 304, 306, 308 using LUTs of a FPGA. Each product operator uses bits output from a respective μ-box as its input bits to obtain product terms. Specifically, product operator 302 uses bits $o_0^1$, $o_1^1$, $o_2^1$, $o_3^1$ output from a first μ-box (e.g., μ-box $\mu_{00}$, $\mu_{10}$, $\mu_{20}$ or $\mu_{30}$) to define an element $x_0$ of vector x and obtain product terms $p_0$, $p_1$, $p_2$, $p_3$. Product operator 304 uses bits $o_0^2$, $o_1^2$, $o_2^2$, $o_3^2$ output from a second μ-box (e.g., μ-box $\mu_{01}$, $\mu_{11}$, $\mu_{21}$ or $\mu_{31}$) to define an element $x_1$ of vector x and obtain product terms $p_4$, $p_5$, $p_6$, $p_7$. Product operator 306 uses bits $o_0^3$, $o_1^3$, $o_2^3$, $o_3^3$ output from a third μ-box (e.g., μ-box $\mu_{02}$, $\mu_{12}$, $\mu_{22}$ or $\mu_{32}$) to define an element $x_2$ of vector x and obtain product terms $p_8$, $p_9$, $p_{10}$, $p_{11}$. Product operator 308 uses bits $o_0^4$, $o_1^4$, $o_2^4$, $o_3^4$ output from a fourth μ-box (e.g., μ-box pow, $\mu_{13}$, $\mu_{23}$ or $\mu_{33}$) to define an element $x_3$ of vector x and obtain product terms $p_{12}$, $p_{13}$, $p_{14}$, $p_{15}$. Each product term is a product of an element of matrix M and an element of a vector x. Accordingly, the product terms can be defined by the following mathematical equations (2)-(17).

$$p_0 = M_0 \cdot x_0 \tag{2}$$

$$p_1 = M_1 \cdot x_0 \tag{3}$$

$$p_2 = M_2 \cdot x_0 \tag{4}$$

$$p_3 = M_3 \cdot x_0 \tag{5}$$

$$p_4 = M_4 \cdot x_1 \tag{6}$$

$$p_5 = M_5 \cdot x_1 \tag{7}$$

$$p_6 = M_6 \cdot x_1 \tag{8}$$

$$p_7 = M_7 \cdot x_1 \tag{9}$$

$$p_8 = M_8 \cdot x_2 \tag{10}$$

$$p_9 = M_9 \cdot x_2 \tag{11}$$

$$p_{10} = M_{10} \cdot x_2 \tag{12}$$

$$p_{11} = M_{11} \cdot x_2 \tag{13}$$

$$p_{12} = M_{12} \cdot x_3 \tag{14}$$

$$p_{13} = M_{13} \cdot x_3 \tag{15}$$

$$p_{14} = M_{14} \cdot x_3 \tag{16}$$

$$p_{15} = M_{15} \cdot x_3 \tag{17}$$

The elements of matrix M are fixed in each round. Therefore, each product term can be computed by a hardwired multiplier implemented by LUTs of a FPGA. In some scenarios, each product term is computed by a multiplier implemented by at least two LUTs of an FPGA. In other scenarios, each product term is computed by a multiplier implemented by at least four LUTs of an FPGA. The present solution is not limited in this regard.

A first bit output from each of the product operators (i.e., bits $p_0$, $p_4$, $p_8$, $p_{12}$) is provided to a sum operator 310. A second bit output from each of the product operators (i.e., bits $p_1$, $p_5$, $p_9$, $p_{13}$) is provided to a sum operator 312. A third bit output from each of the product operators (i.e., bits $p_2$, $p_6$, $p_{10}$, $p_{14}$) is provided to a sum operator 314. A fourth bit output from each of the product operators (i.e., bits $p_3$, $p_7$, $p_{11}$, $p_{15}$) is provided to a sum operator 316. Each sum operator 310, 312, 314, 316 uses the respective four bits to obtain a sum $y_o$, $y_1$, $y_2$ or $y_3$ thereof which represents an element of vector y. The sums can be defined by the following mathematical equations (18)-(21).

$$y_0 = p_0 + p_4 + p_8 + p_{12} \tag{18}$$

$$y_1 = p_1 + p_5 + p_9 + p_{13} \tag{19}$$

$$y_2 = p_2 + p_6 + p_{10} + p_{14} \tag{20}$$

$$y_3 = p_3 + p_7 + p_{11} + p_{15} \tag{21}$$

Each sum can be obtained using an LUT that adds the corresponding bits of the respective four product terms.

As evident from the above discussion, a 16-bit large scale S-box has the following area requirements: a substitution layer sublayer with 16 LUTs (4 μ-boxes times 4 LUTs per μ-box); a mixing sublayer with 80 LUTs (4 output elements times 20 LUTs per output element); one layer with 96 LUTs; and the while four-layer S-box with 394 LUTs. It should be emphasized that the 16-bit S-box's FPGA implementation requires the same number of LUTs, no matter which μ-box mappings or MDS matrices are chosen. This makes the 16-bit S-box design eminently suitable for applications requiring customizable S-boxes.

The above described S-box 100 can be used in various systems. Illustrative systems in which the S-box 100 can be used will now be discussed. These systems allow a user to generate sovereign cipher designs by forming the cipher using a series of pre-defined building blocks, testing the cipher and then synthesizing a hardware image for installation in an FPGA of a given platform. The building blocks for the cipher design include the large scale S-box 100 which implements non-linear binary mapping functions. The large scale S-box 100 can be implemented via an FPGA using LUTs that typically support much smaller input/output (I/O) than would otherwise be required for these design implementation. Typical FPGA chips provide LUTs with four inputs, five inputs or six inputs while modern large scale S-box designs require sixteen or more inputs. The present solution provides an innovative solution to this problem by providing a unique method for the design of a strong large scale S-box that can be implemented using the resources available with a typical FPGA.

A successful differential attack mounted on an S-box based cipher—an attack that takes less work than a brute force key search, which requires $2^k$ work, where k is the key size—depends on the S-box's maximum differential probability. The larger this probability, the less work the attack requires. To analyze the 16-bit S-box's resistance to differential attacks, a computer program generated 100 random 16-bit S-boxes with three layers, and likewise for four, five, six, seven, and eight layers. Another computer program computed each S-box's maximum differential probability. (The program executed about 216×216 loop iterations per S-box.). The following TABLE 1 lists the results.

TABLE 1

| Max differential | Number of occurrences for N-layer S-boxes | | | | | |
|---|---|---|---|---|---|---|
| probability | N = 3 | N = 4 | N = 5 | N = 6 | N = 7 | N = 8 |
| 18/65536 | 45 | 46 | 58 | 48 | 47 | 49 |
| 20/65536 | 45 | 52 | 40 | 48 | 50 | 49 |
| 22/65536 | 7 | 2 | 2 | 4 | 3 | 2 |
| 24/65536 | 1 | — | — | — | — | — |
| 32/65536 | 2 | — | — | — | — | — |

With three layers, some S-boxes had maximum differential probabilities as high as 32/65536. With four layers, no S-boxes had maximum differential probabilities higher than 22/65536, an improvement over three layers. Adding more layers did not necessarily yield any further improvement. Therefore, a 16-bit S-box was designed with four layers, and its worst case maximum differential probability is taken to be 22/65536, or 2-11.54.

A successful linear attack mounted on an S-box based cipher depends on the S-box's maximum absolute linear bias. The larger this bias, the less work the attack requires. To analyze the 16-bit S-box's resistance to linear attacks, a computer program computed each four- through eight-layer S-box's maximum absolute linear bias based on a random sample of 100 million, or about 2.3 percent, of the over 4 billion possible linear approximations. (The program executes 108×216 loop iterations per S-box.). The following TABLE 2 lists the results.

TABLE 2

| Linear attack resistance | | |
|---|---|---|
| | Maximum Absolute Linear Bias among 100 S-boxes | |
| S-box Layers | Smallest | Largest |
| 4 | 712/65536 | 840/65536 |
| 5 | 702/65536 | 838/65536 |
| 6 | 694/65536 | 890/65536 |
| 7 | 696/65536 | 850/65536 |
| 8 | 696/65536 | 818/65536 |

Among the 100 four-layer S-boxes, the maximum absolute linear bias ranged from 712/65536 to 840/65536. Adding more layers eventually yielded a slight reduction in the maximum absolute linear bias—but not enough to justify the additional cost in FPGA area. Therefore, the 16-bit S-box is designed with four layers.

Because the preceding computer program evaluated only a small sample of the possible linear approximations, another computer program computed the exact maximum absolute linear bias, based on all linear approximations, for the 100 four-layer S-boxes. (The program executes about 232×216 loop iterations per S-box.). These S-boxes' exact biases ranged from 784/65536 to 932/65536. Therefore, the 16-bit S-box's worst case maximum absolute linear bias is taken to be 932/65536, or 2-6.14.

Number of cipher rounds. Consider a complete cipher with a k-bit key and some number of rounds, each round built from the 16-bit S-boxes. To resist a differential attack in which at least n S-boxes are active, (1/2-11.54)n is greater than 2k. To resist a linear attack in which at least n S-boxes are active, ((1/2-6.14)2)n is greater than 2k [3]. Therefore, for a 128-bit key, the complete cipher needs n=12 to resist a differential attack and n=11 to resist a linear attack. For a 256-bit key, the complete cipher needs n=23 and n=21, respectively.

Suppose, for example, a complete cipher is designed such that in every two successive rounds, at least five S-boxes are active. Then for a 128-bit key, the cipher should have at least six rounds; for a 256-bit key, at least ten rounds. The cipher should also have some number of additional rounds to provide a security margin.

This attack resistance analysis is based on a sample of 100 S-boxes. When designing a cipher using specifically chosen S-boxes, their actual maximum differential probabilities and maximum absolute linear biases can be computed and used to determine the number of cipher rounds.

Figure 4:
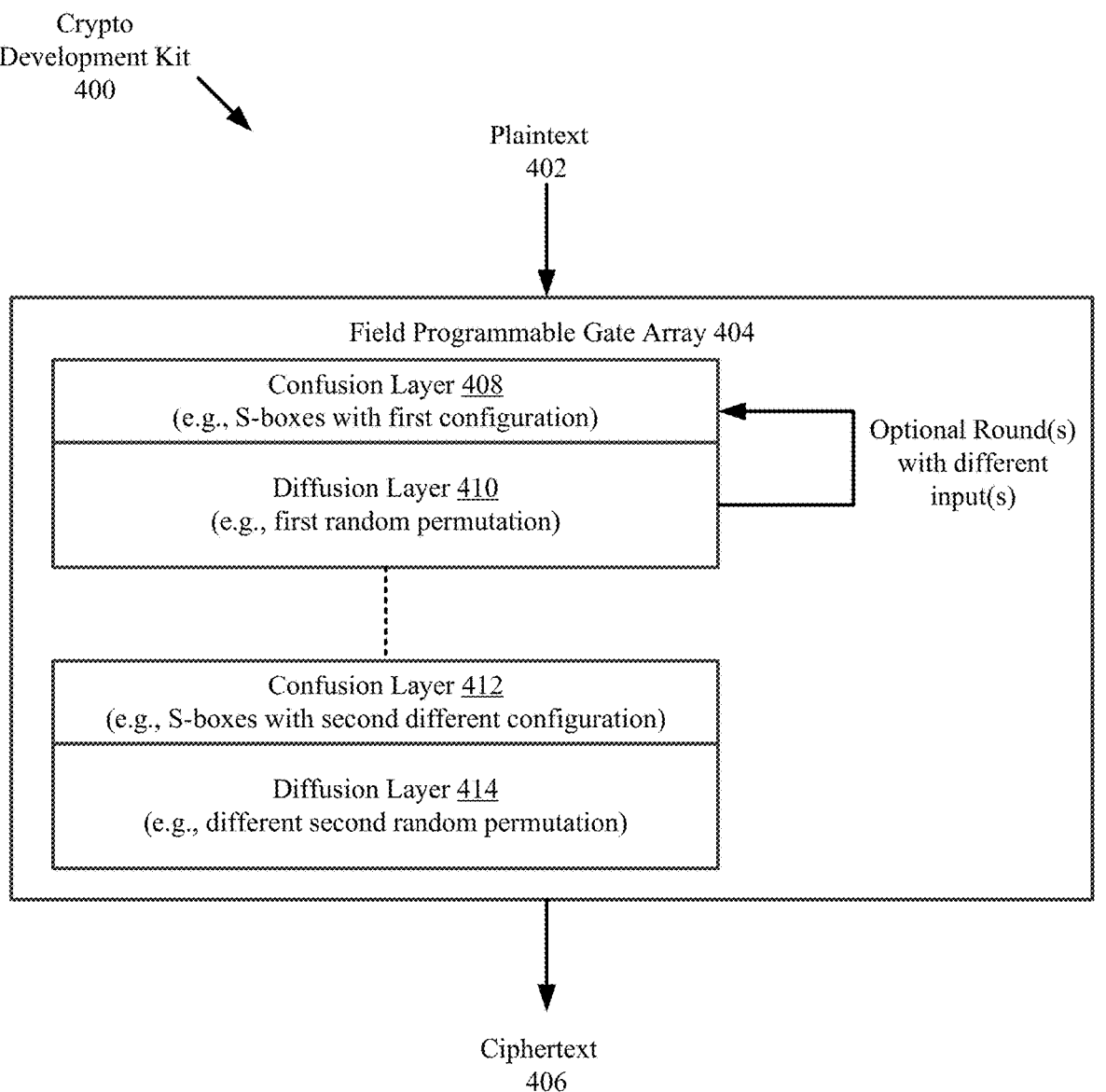
FIG. 4 provides an illustration of a CDK implementing the present solution.

The S-box described above can be used in a Crypto Development Kit that aims to provide a collection of tools and libraries that can be used to build FPGA-based circuit implementing cryptographic algorithms for specific applications. An illustrative crypto development kit 400 is shown in FIG. 4. The circuit designed using the crypto development kit 400 is implemented via an FPGA 404. The FPGA 404 is generally configured to receive plaintext 402 as an input, process the plaintext 402 to generate ciphertext 406, and output the ciphertext 406. Two or more sets of layers are implemented by the FPGA. Each set includes a confusion layer and a diffusion layer. For example, a first set includes confusion layer 408 and a diffusion layer 410. A second set includes confusion layer 412 and a diffusion layer 414. The present solution is not limited in this regard. One or more sets of layers may optionally be designed to perform multiple rounds with different inputs, as shown in FIG. 4.

Each confusion layer 408, 412 includes S-boxes. The S-boxes can be the same as or similar to S-box 100 discussed above. The S-boxes of the first confusion 408 layer have a first configuration, while the S-boxes of the second confusion layer 412 have a second different configuration. The diffusion layers 410, 414 implement different random permutations.

The S-boxes of the present solution can also be used with systems for providing cryptographic systems with a self-synchronizing mode of operation. These cryptographic systems may implement block cipher based cryptographic algorithms. The self-synchronizing mode of operation enables automatic cryptographic resynchronization between transmitters and receivers, and also enables late network entry by communication devices into an already established conversation. The self-synchronizing mode of operation provides a way for a receiver to synchronize its local cryptographic algorithm when joining a conversation for which the synchronization information and initialization variable for the cryptographic algorithm has already been sent to participants. Based on pseudo-random events, the communication devices of a participant self-synchronize their cryptographic algorithms during the conversation. The pseudo-random events are based on the ciphertext being transmitted because the ciphertext appears statistically random. Every node on the network has access to the ciphertext, and is configured to detect patterns in the ciphertext. When a pattern is detected, a node will re-initialize a state of its cryptographic algorithm using the ciphertext transmitted over the channel. The channel may include, but is not limited to, a low bit error rate channel. In this way, the nodes will access uncorrupted ciphertext and concurrently synchronize states of their cryptographic algorithms.

The block cipher cryptographic algorithms can include, but are not limited to, adaptations of sponge based cryptographic algorithms. Sponge constructions will be described herein to assist the reader with understanding the present solution. A duplex construction will be described herein to assist the reader in understanding an illustrative adaptation of sponge construction. Sponge and duplex constructions provide frameworks representing new cryptographic paradigms with many advantages including processing performance and provable computational cryptographic strength. A novel cryptographic algorithm design is described herein that is based on the sponge and duplex construction frameworks. More particularly, the novel cryptographic algorithm comprises a unique permutation function $f$ that is used with a sponge construction and/or a duplex construction. In this regard, the present solution provides the same advantages of conventional sponge and duplex constructions, as well as other additional advantages. These other additional advantages include, but are not limited to: the provision of a highly configurable and customizable cryptographic algorithm; the provision of a symmetric key algorithm that is designed against a military threat model; the provision of increased throughput suitable to support high-rate networked waveforms; and the provision of an algorithm that can be used with key lengths that are longer than the key lengths which can be used with conventional cryptographic algorithms. Longer key lengths result in a higher level of security.

For military applications, the customers desire sovereign cryptography. Sovereign cryptography provides a feature called security autonomy where the customers have their own variant of a cryptographic algorithm. One way to obtain security autonomy is for the customers to specify their own cryptographic algorithm to be implemented in the device(s). This solution is not economically feasible. As such, the present solution provides a proprietary cryptographic algorithm that can be customized in various ways. The customization capability mainly lies in two types of customization, namely factory customization and field customization.

Factory customization is more substantial in terms of changing the cryptographic algorithms' structure and adding new algorithm blocks, but also requires one to have the requisite expertise. One disadvantage of factory customization is that human error can cause degradation of the cryptographic system. This disadvantage is addressed by the present solution. In this regard, the present solution employs a cryptographic (e.g., encryption and/or decryption) algorithm that can be customized without any degradation to the security thereof. Another disadvantage is that some customers do not want others (i.e., the people with the requisite expertise) to have knowledge of their own variant of a cryptographic algorithm. The present solution also addressing this disadvantage by providing a cryptographic algorithm that can be customized in the field.

Field customization allows customers to make changes to the cryptographic algorithm via a tool after the device is provided to them. All possible information that can be input into the system via the tool to provide the field customization are equally valid in terms of not degrading the cryptographic strength of the cryptographic algorithm.

Accordingly, the present solution has two levels of customization. A first Custom Crypto (CC) capability allows customized versions of the sponge based cryptographic algorithm to be embedded in a device (e.g., a handheld radio) at the factory. There are a number of CC settings that are specified for a custom version of the sponge based cryptographic algorithm, after an analysis to ensure that it is secure. The CC settings are stored and loaded into the encryption/decryption circuitry at power-on. The CC capability can be implemented in a substitution layer, a permutation layer and/or a round constant addition layer of a permutation function $f$, as discussed below.

A second Custom Algorithm Modification (CAM) capability allows a user to customize the encryption/decryption algorithm in the field after power-on (i.e., after the device employing the cryptographic algorithm has been provided to the customer). CAM settings are stored in an N-bit (e.g., 128 bit) register that can be changed at any time (except during encryption/decryption). All possible CAM register values must yield different, fully secure customized algorithms. CAM is implemented in a mixer layer of the permutation function $f$. The CC and CAM capabilities will be described in detail below.

The present solution also has the following additional advantages: increased processing performance and provable computational cryptographic strength; cost effective alternative to embedded sovereign cryptography; includes cryptographic constructs and key lengths to provide post quantum security in a reasonable hardware and software footprint; and designed against a military threat model.

Figure 5:
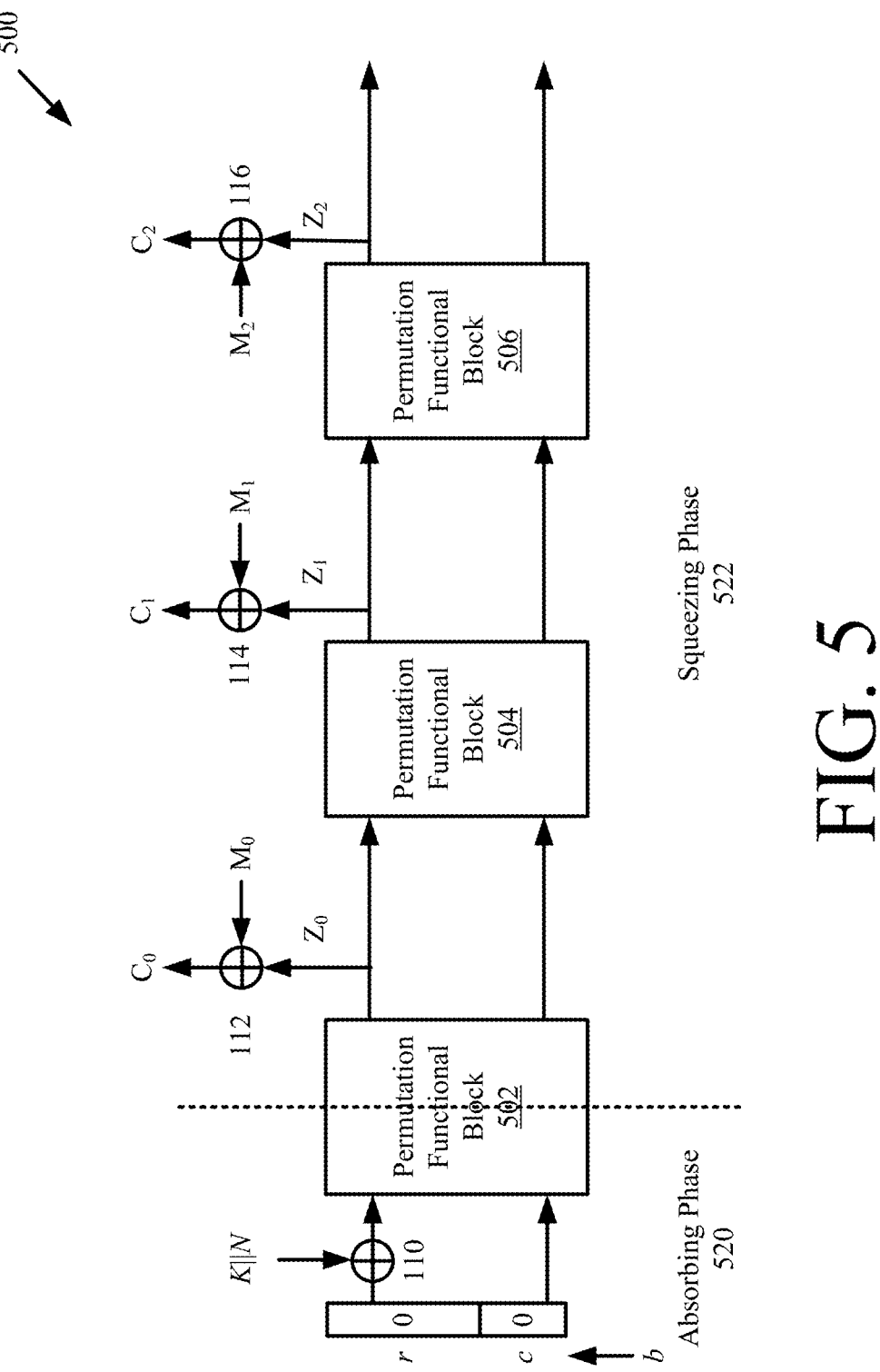
FIG. 5 provides an illustration of a sponge construction employing a unique permutation function.

Referring now to FIG. 5, there is provided a schematic illustration of an illustrative architecture for a sponge construction 500 implementing the present solution. Notably, the sponge construction 500 uses a unique permutation function $f$ (described below) to provide the traditional suite of cryptographic modes. This will become more evident as the discussion progresses.

As shown in FIG. 1, the sponge construction 500 is generally designed to implement symmetric cryptography functionalities, namely key derivation and message encryption/decryption. The sponge construction 500 is a simple iterated construction for building a function F based on a unique permutation function $f$. The function F has a variable-length input and an arbitrary output length. The unique permutation function $f$ operates on a state of b=r+c bits, where r (e.g., 128 bits) is the bitrate and c (e.g., 384 bits) is the capacity. The capacity c determines the security level of the sponge construction.

Notably, the sponge construction 500 can be implemented in hardware, software or a combination of both hardware and software. As such, the operations of each functional block 502-506 may be implemented using hardware and/or software. The hardware can include, but is not limited to an electronic circuit. The electronic circuit can include passive components, active components and logical components.

The sponge construction 500 is divided into two phases. The first phase is an absorbing phase 520 in which the cryptographic key K or K||N (i.e., a concatenation of the cryptographic key K and a flag N) is absorbed into a state of the sponge construction 500 while interleaving with applications of the underlying permutation function $f$. Such absorption is achieved by combining K (or K||N) with the first r bits of the initialized state bits b. In some scenarios, the bits b (e.g., 512 bits) are initialized to zero. The present solution is not limited in this regard. The bits b (e.g., 512 bits) may alternatively be initialized to any bit value (e.g., any 512 bit value). As such, each user could generate their own unique value to set during the initialization phase.

The combining of K (or K||N) with the first r bits of the initialized state can be achieved via exclusive OR (XOR) operations 510, as shown in FIG. 5. XOR operations are well known in the art, and therefore will not be described in detail here. Still, it should be understood that the XOR operations are performed on a bit-by-bit basis. The result of each XOR operation is true whenever an odd number of inputs are true and false whenever an even number of inputs are true. The results of the XOR operations are then passed to permutation functional block 502 where the results are interleaved with applications of the unique permutation function $f$.

The second phase is a squeezing phase 522 in which keystream blocks $Z_0$, $Z_1$, $Z_2$ are produced by the performance of the unique permutation function $f$ in permutation functional blocks 502-506. Each keystream block $Z_0$, $Z_1$, $Z_2$ comprises r bits. The unique permutation function $f$ will be described in detail below. Still, it should be understood that the permutation function $f$ maps each possible value of the bits input thereto into a particular unique value of the output bits. Notably, permutation functional block 502 takes the output of the absorbing phase 520 as an input. Permutation functional block 504 takes the output of permutation functional block 502 as an input. Permutation functional block 506 takes the output of permutation functional block 504 as an input.

Next, the keystream blocks $Z_0$, $Z_1$, $Z_2$ are used to encrypt a message M. In this regard, the keystream blocks $Z_0$, $Z_1$, $Z_2$ can be truncated to a desired length 1. Additionally or alternatively, the message M may be padded to make it a multiple of r (if it is not a multiple of r). The message M is parsed into a plurality of message blocks $M_0$, $M_1$, $M_2$. Each message block $M_0$, $M_1$, $M_2$ comprises a plurality of bits of the message M. Each keystream block is then combined with a respective message block so as to produce an encrypted data block. The encrypted data block can include, but is not limited to, a ciphertext block $C_0$, $C_1$ or $C_2$. The present solution is described herein in relation to ciphertext. The present solution is not limited in this regard. The present solution can be used to encrypt any type of data (e.g., text, audio, video, etc. . . . ).

In some scenarios, the combining of the keystream and message blocks is achieved using modular arithmetic. For example, each keystream block $Z_0$, $Z_1$, $Z_2$ is combined with a respective block of message bits $M_0$, $M_1$, $M_2$ via modulo 2 addition. The modulo 2 addition can be implemented using an XOR operation, as shown in FIG. 5. The XOR operation is performed on a bit-by-bit basis. As such, a first bit $m_0$ of a message block $M_0$, $M_1$ or $M_2$ is combined with a first bit $z_0$ of a respective keystream block $Z_0$, $Z_1$ or $Z_2$ via modulo 2 addition. Next, a second bit $m_1$ of a message block $M_0$, $M_1$ or $M_2$ is combined with a first bit $z_1$ of a respective keystream block $Z_0$, $Z_1$ or $Z_2$ via modulo 2 addition, and so on.

Figure 6:
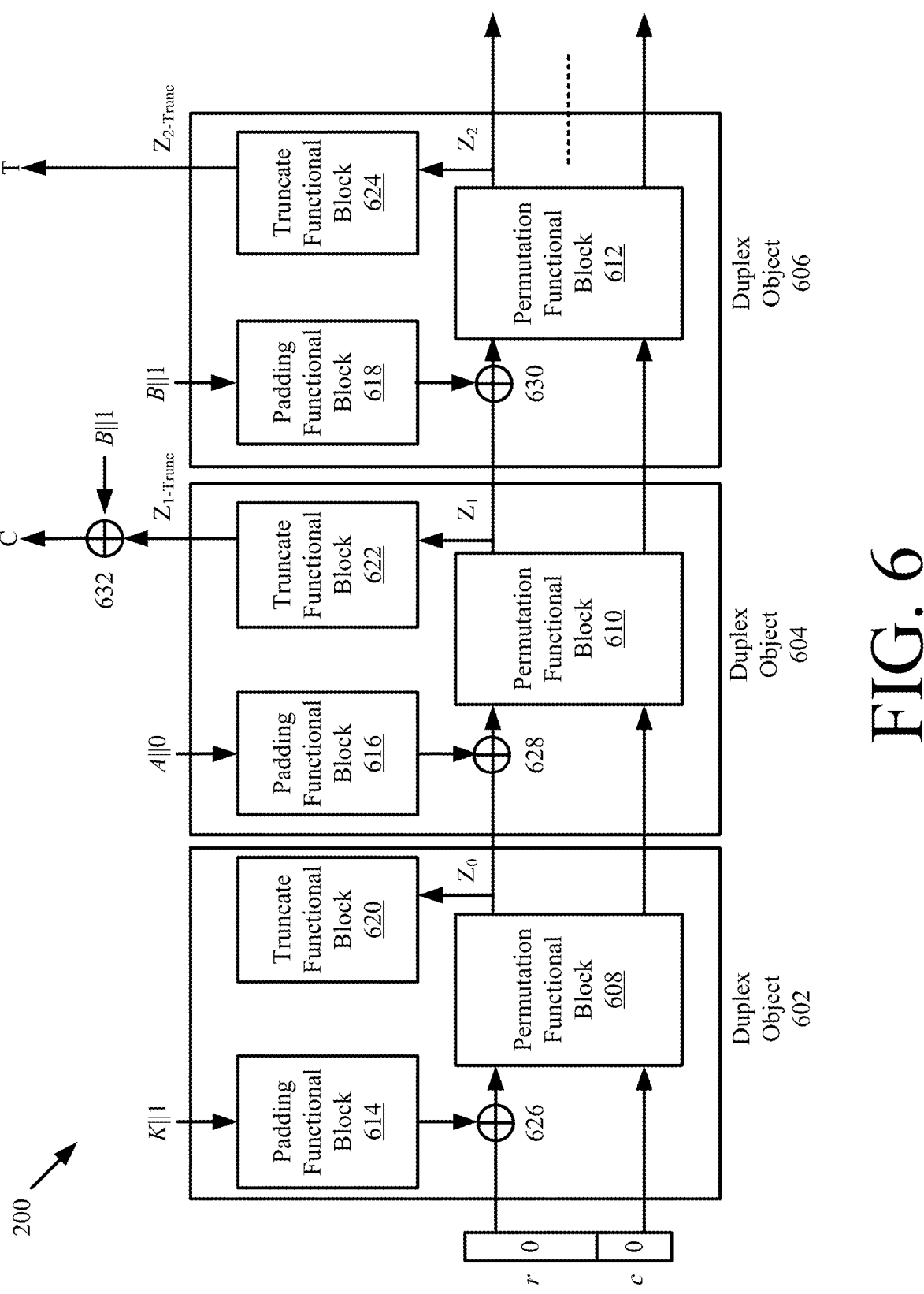
FIG. 6 provides an illustration of a duplex construction employing a unique permutation function.

Referring now to FIG. 6, there is provided a schematic illustration of an illustrative architecture for a duplex construction 600 implementing the present solution. The duplex construction 600 is an adaptation of the sponge construction framework that, together with the unique permutation function $f$ (described below), provides an additional Authenticated Encryption (AE) cryptographic mode. This mode allows both source and integrity verification of encrypted traffic. This will become more evident as the discussion progresses.

Notably, the duplex construction 600 can be implemented in hardware, software or a combination of both hardware and software. As such, the operations of each component 602-632 may be implemented using hardware and/or software. The hardware can include, but is not limited to an electronic circuit. The electronic circuit can include passive components, active components and logical components.

In the duplex construction 600, the absorbing phase and squeezing phase are combined into each of a plurality of duplex operations. Accordingly, the duplex construction 600 comprises a plurality of duplex objects 602-606. The operations of each duplex object will be described separately below. Notably, the state of each duplex object call is preserved.

The input to duplex object 602 is a cryptographic key K (or optionally K||1, i.e. a concatenation of the cryptographic key K and a flag 1). The cryptographic key K (or optionally K||1) is padded in padding functional block 614 to make it a multiple of r (if it is not a multiple of r). The padding can involve appending bits to the beginning or end of the cryptographic key K (or optionally K||1). Next, the output of padding functional block 614 is then combined at 626 with the first r bits of the initialized state bits b. In some scenarios, the bits b are initialized to zero, where b=r+c. The present solution is not limited in this regard. The bits b (e.g., 512 bits) may alternatively be initialized to any bit value (e.g., a 512 bit value). As such, each user could generate their own unique value to set during the initialization phase.

The combining of the padding functional block output and the first r bits of the initialized state can be achieved via XOR operations 626, as shown in FIG. 6. XOR operations are well known in the art, and therefore will not be described in detail here. Still, it should be understood that the XOR operations are performed on a bit-by-bit basis. The results of the XOR operations are then passed to permutation functional block 608. In permutation functional block 608, the unique permutation function $f$ is performed using the results of the XOR operations as inputs so as to generate a keystream block $Z_0$. The keystream block $Z_0$ is then truncated to a desired length 1, as shown by truncate functional block 620. The value of 1 here can be less than r.

The input to duplex object 604 is authentication data A (or optionally A||0, i.e. a concatenation of authentication data A and a flag 0). The authentication data A can include but is not limited to, authenticated packet headers. The authentication data A (or optionally A||0) is padded in padding functional block 616 to make it a multiple of r (if it is not a multiple of r). The padding of padding functional block 616 is the same as or similar to that of padding functional block 614. Next, the output of padding functional block 616 is then combined with keystream block $Z_0$. This combining can be achieved via XOR operations 628, as shown in FIG. 6. XOR operations are well known in the art, and therefore will not be described in detail here. Still, it should be understood that the XOR operations are performed on a bit-by-bit basis. The results of the XOR operations are then passed to permutation functional block 610. In permutation functional block 610, the unique permutation function $f$ is performed so as to generate a keystream block $Z_1$. The keystream block $Z_1$ is then optionally truncated to a desired length 1, as shown by truncate functional block 622. The value of 1 here can be less than r. Truncation may be performed when the number of bits contained in the message body B is less than r. In this case, the value of 1 equals the number of bits contained in the message body B. The truncated keystream block $Z_{1-Trunc}$ is output from duplex object 604.

Thereafter, the truncated keystream block $Z_{1-Trunc}$ is combined with a message body B (or optionally B||1, i.e. a concatenation of message body B and a flag 1). The message body B can include, but is not limited to, packet payload. This combining is achieved via XOR operations 632, which produces encrypted data (e.g., ciphertext) C. The XOR operations 632 are performed on a bit-by-bit basis.

The input to duplex object 606 is message body data B (or optionally B||1). The message body data B can include but is not limited to, packet payload data. The message body data B (or optionally B||1) is padded in padding functional block 618 to make it a multiple of r (if it is not a multiple of r). The padding of padding functional block 618 is the same as or similar to that of padding functional blocks 614 and 616. Next, the output of padding functional block 618 is then combined with keystream block $Z_1$. This combining can be achieved via XOR operations 630, as shown in FIG. 6. XOR operations are well known in the art, and therefore will not be described in detail here. Still, it should be understood that the XOR operations are performed on a bit-by-bit basis. The results of the XOR operations are then passed to permutation functional block 612. In permutation functional block 612, the unique permutation function $f$ is performed so as to generate a keystream block $Z_2$. The keystream block $Z_2$ is then optionally truncated to a desired length 1, as shown by truncate functional block 624. The value of 1 here can be less than r. The truncated keystream block $Z_{2-Trunc}$ is output from duplex object 604. The truncated keystream block $Z_{2-Trunc}$ is then used as an authentication tag T.

In a communications scenario, the encrypted data (e.g., ciphertext) C and the authentication tag T would be transmitted from a source communication device to a destination communication device. The cryptographic key K would not be transmitted since it would be known by both devices.

The advantages of the duplex construction 600 are that: a single cryptographic key is required; encryption and authentication requires only a single pass; intermediate tags are supported thereby; additional authentication data (e.g., packet headers) is supported thereby; it is secure against generic attacks; and the ability to trade off speed and security by adjusting the value of r.

Figure 7:
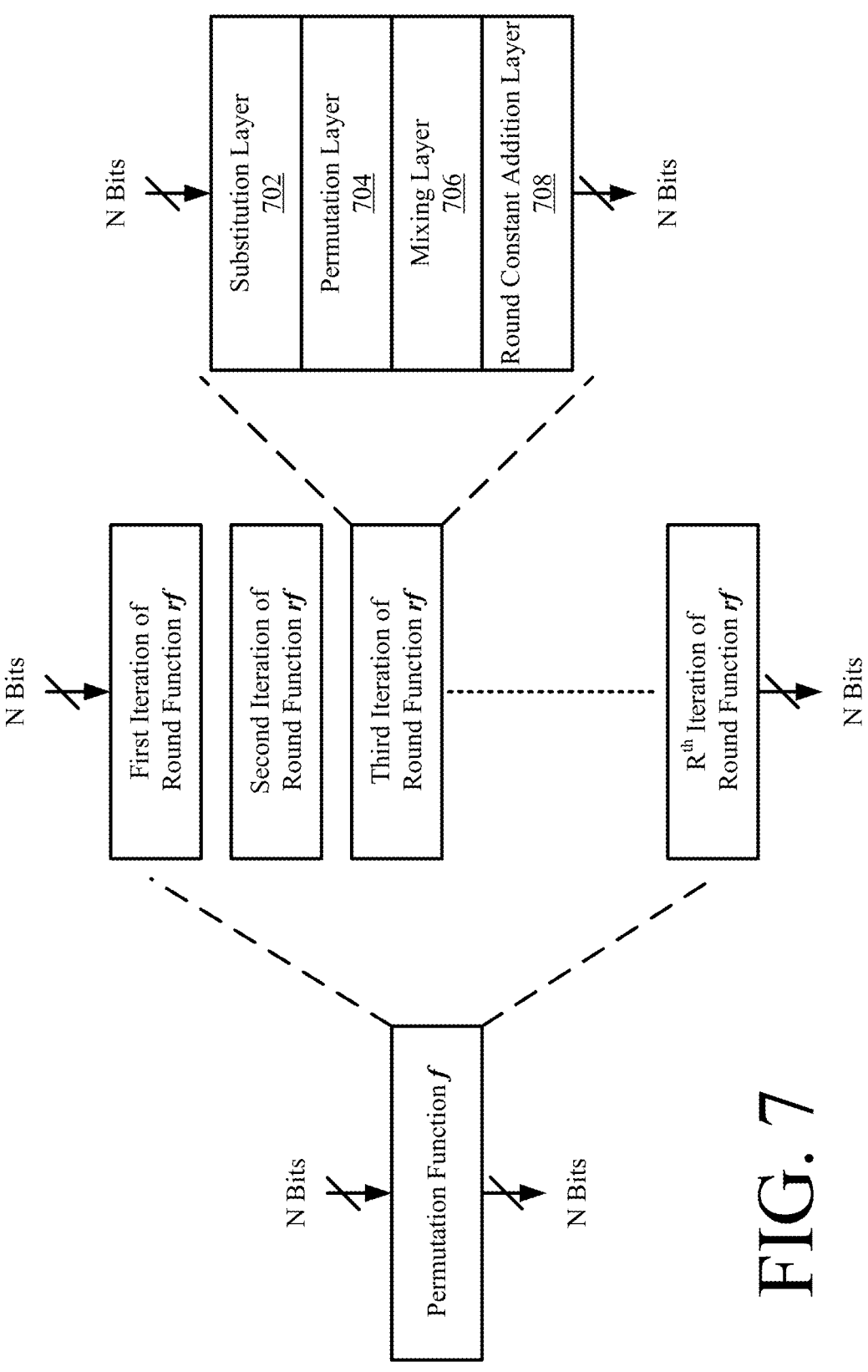
FIG. 7 provides an illustration that is useful for understanding the unique permutation function $f$.

Referring now to FIG. 7, there is provided a schematic illustration that is useful for understanding the unique permutation function $f$ of the present solution which is employed in the sponge and duplex constructions described above in relation to FIGS. 5-6. The permutation function $f$ supports any key size (e.g., 128 bits or 256 bits) and is bijective. Since the permutation function $f$ is bijective, $f^1$ (inverse of $f$) exists by definition. While $f^1$ is not used in practice, it may be helpful for cryptanalysis and verification purposes. Notably, the number of bits that are input and/or output from the permutation function $f$ is also customizable.

The permutation function $f$ comprises a round function $f_{round}$ that is iterated R times, depending on the key size. The round function $f_{round}$ consists of the following layers: a substitution layer 702; a permutation layer 704; a mixing layer 706; and a round constant addition layer 708. In the substitution layer 702, the bits input thereto are substituted with first substitute bits in accordance with a particular transformation and/or mapping algorithm. For example, input bits 010001 are substituted with bits 1010. The number of bits input/output to/from the substitution layer 702 can be the same or different. In the permutation layer 704, the bits input thereto are re-arranged. In the mixing layer 706, at least two outputs of the permutation layer are combined together. In the round constant addition layer 708, a constant is added to the output of the mixing layer. The manners in which the operations of each layer 702-708 are achieved will be discussed in detail below.

Notably, R is an integer which has a value large enough to resist differential attacks, linear attacks and other attacks depending on the cryptographic key size (e.g., R=10 for a 128 bit key or R=16 for a 256 bit key). In this regard, R is a customizable element of the permutation function $f$. In some scenarios, R is determined by (1) calculating the number of rounds needed for linear and differential cryptanalysis and (2) adding some buffer to increase the security margin.

Figure 8:
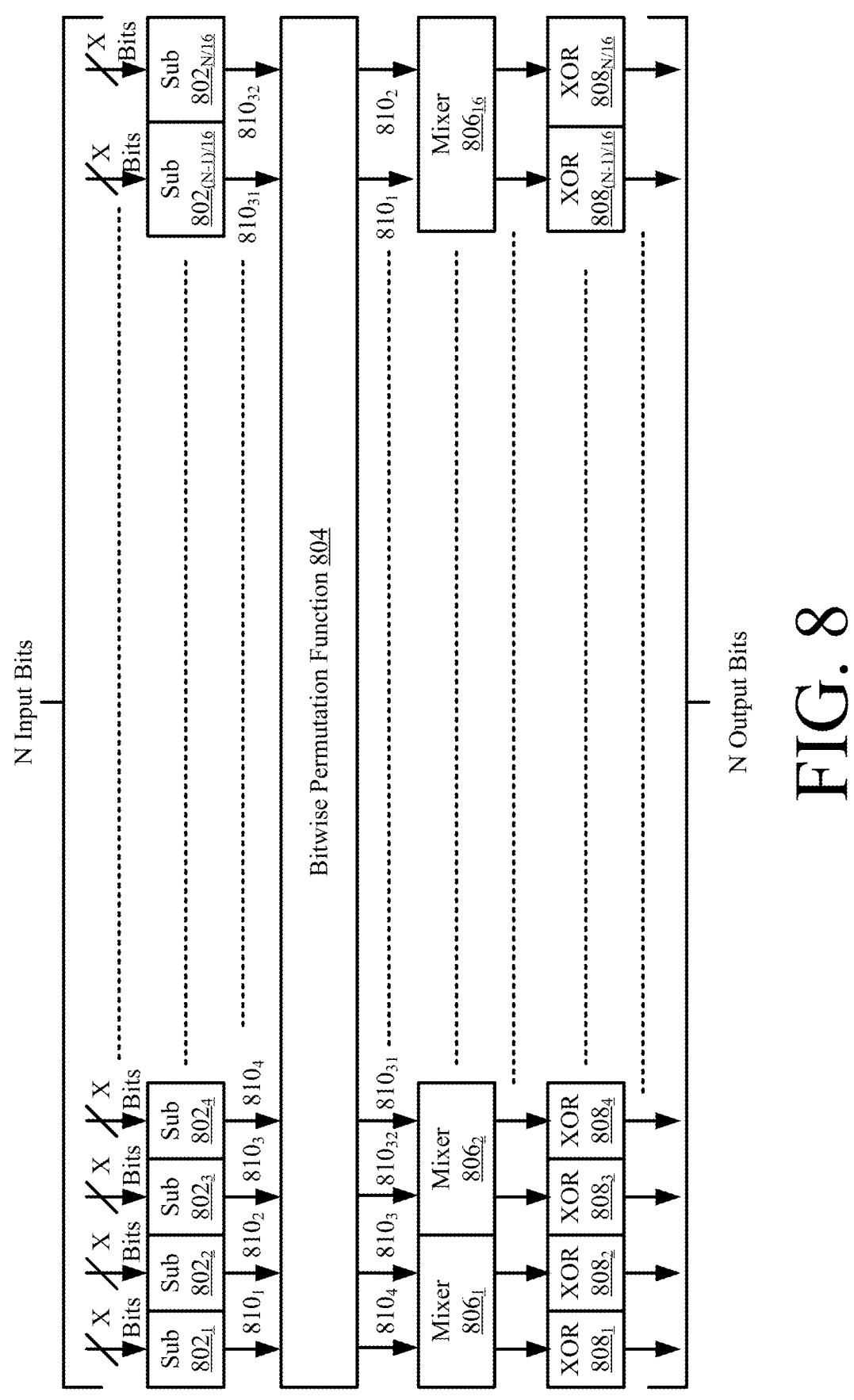
FIG. 8 provides an expanded block diagram of the round function shown in FIG. 7.

Referring now to FIG. 8, there is provided an expanded block diagram of the round function $f_{round}$. The substitution layer 702 comprises a plurality of identical substitution boxes (or S-boxes) $802_1, 802_2, 802_3, 802_4, \ldots, 802_{(N-1)/16}$, $802_{N/16}$ which collectively receive N input bits (e.g., 512 input bits) and individually receive X bits of the N input bits (e.g., 16 bits of 512 input bits). The value of N is selected to be large enough to keep a cryptographic key secure. For example, the value of N is selected to be 512 bits for a cryptographic key having a size of 128 bits or 256 bits.

The purpose of the S-boxes is to perform substitution so as to obscure the relationship between the cryptographic key and encrypted data (e.g., ciphertext). The S-boxes $802_1$, $802_2, 802_3, 802_4, \ldots, 802_{(N-1)/16}, 802_{N/16}$ can each include, but are not limited to, S-box 100 of FIG. 1. The S-boxes can be implemented as look-up tables. The look-up tables can be fixed or dynamically generated using the cryptographic key.

The permutation layer 704 comprises a bitwise permutation function 804. The purpose of the bitwise permutation function 804 is to permute or change a bit position of each bit $810_1, 810_2, 810_3, 810_4, \ldots, 810_{31}, 810_{32}$ input thereto relative to all other bits input thereto. Bitwise permutation functions are well known in the art, and therefore will not be described in detail herein. Any known or to be known bitwise permutation function can be used herein without limitation provided that the following properties are satisfied thereby.

(1) Each bit $810_1$, $810_2$, $810_3$, $810_4$, . . . , $810_{31}$, $810_{32}$ permutes to an output bit position different from its input bit position.

(2) All outputs of a given S-box go to X different mixers.

(3) The permutation period of the permutation function $f$ exceeds the number of rounds R.

For example, the bitwise permutation function includes a linear permutation function, an affine permutation function, or a random permutation function.

The mixing layer 706 comprises a mixing function that is implemented via a plurality of mixers $806_1$, $806_2$, . . . , $810_{16}$. In the scenario shown in FIG. 8, one mixer is provided for every two S-boxes. The present solution is not limited in this regard. The particular number of S-boxes per mixer is customizable. Also, the mixing function is a customizable element of the present solution. The purpose of the mixing function is to provide local diffusion (i.e., across two words) and increase the linear and differential branch numbers of a round from two to three. In this regard, mixers based on matrix multiplication in Galois Field $GF(2^M)$ may be employed because they satisfy all of the following constraints: the matrix is invertible in $GF(2^4)/<p(x)>$; the matrix has a differential and linear branch number equal to three; and the transformation is efficiently implementable in hardware.

The round constant addition layer 708 comprises a plurality of addition operations represented by blocks $808_1$, $808_2$, $808_3$, $808_4$, . . . , $808_{(N-1)/16}$, $808_{N/16}$. The purpose of the addition operations is to add a constant N bit value to the state using bitwise XOR in order to disrupt symmetry and prevent slide attacks. Notably, the round constant must be fixed random N-bit values. Each round i must use a different round constant. The round constant is customizable, and should be unique for each round to prevent against slide attacks and be random, pseudorandom or highly asymmetric to reduce symmetry in the state. A round constant can be chosen at random in accordance with a chaotic, random or pseudo-random number algorithm. Chaotic, random and pseudo-random number algorithms are well known in the art, and therefore will not be described herein. Any known or to be known chaotic, random or pseudo-random number algorithm can be used herein without limitation.

Referring now to FIG. 9, there is provided a flow diagram of an illustrative method 900 for generating encrypted data (e.g., ciphertext) that is useful for understanding the present solution. Method 900 begins with block 902 and continues with block 904 where a plurality of layers (e.g., layers L0, L1, L2, L3 of FIG. 1) of an S-box (e.g., S-box 100 of FIG. 1) is implemented on a field programmable gate array (e.g., FPGA 404 of FIG. 4). The S-box is configured to meet the following requirements: no fixed points where S(x)=x; and no opposite fixed points where S(x)=bitwise complement of x. The plurality of layers may comprise four layers. Each of the layers comprises a substitution sublayer (e.g., substitution sublayer SL0, SL1, SL2 or SL3 of FIG. 1) and a mixing sublayer (e.g., mixing sublayer $m_0$, $m_1$, $m_2$ or $m_3$ of FIG. 1).

The substitution sublayer comprises a plurality of μ-boxes (e.g., μ-boxes $\mu_{00}$, $\mu_{01}$, $\mu_{02}$, $u_{03}$, $\mu_{10}$, $\mu_{11}$, $\mu_{12}$, $\mu_{13}$, $\mu_{20}$, $\mu_{21}$, $\mu_{22}$, $\mu_{23}$, $\mu_{30}$, $\mu_{31}$, $\mu_{32}$, and/or $\mu_{34}$ of FIGS. 1 and/or 200 of FIG. 2). Each of said μ-boxes is configured to meet the following requirements: no fixed points where μ(x)=x; no opposite fixed points where μ(x)=bitwise complement of x; maximum differential probability of 4/16 or smaller; and maximum absolute linear bias of 4/16 or smaller. In some scenarios, the μ-boxes may comprise four μ-boxes with a 4-bit input and a 1-bit output. Each μ-box may be implemented via at least four look-up tables of the field programmable gate array.

In block 906, each μ-box performs a different randomly chosen non-linear bijective mapping from $GF(2^4)$ to $GF(2^4)$. The outputs of the μ-boxes are provided to the mixing sublayer as shown by block 908.

In 910, the mixing sublayer computes a plurality of product terms each representing a product of an element of a maximum distance separable matrix M and an output from one of the plurality of μ-boxes. The product terms may be computed by product operators that are each implemented via at least two lookup tables of the field programmable gate array. Each of the product operators may be implemented via four lookup tables of the field programmable gate array. The mixing sublayer also computes a plurality of column vector elements each comprising a sum of respective ones of the plurality of product terms, as shown by block 912.

Another round of the operations in blocks 906/908 and/or 910/912 may optionally be performed as shown by block 914. In some scenarios, each element of the maximum distance separable matrix M, the output of each of the μ-boxes, and each of the column vector elements comprises an element in a finite field $GF(2^4)/f(x)$, wherein $f(x)$ is a degree-4 irreducible polynomial. Each round may use a different randomly chosen maximum distance separable matrix and a different randomly chosen irreducible polynomial.

In optional block 916, the column vector elements may be used as inputs to a diffusion layer (e.g., diffusion layer 410 or 414 of FIG. 4) of a cipher algorithm or a permutation layer (e.g., permutation layer 704 of FIG. 7) of a cryptographic algorithm. Subsequently, method 900 continues to block 918 where it ends or other operations are performed. The other operations can include, but are not limited to, returning to 902.

Figure 10:
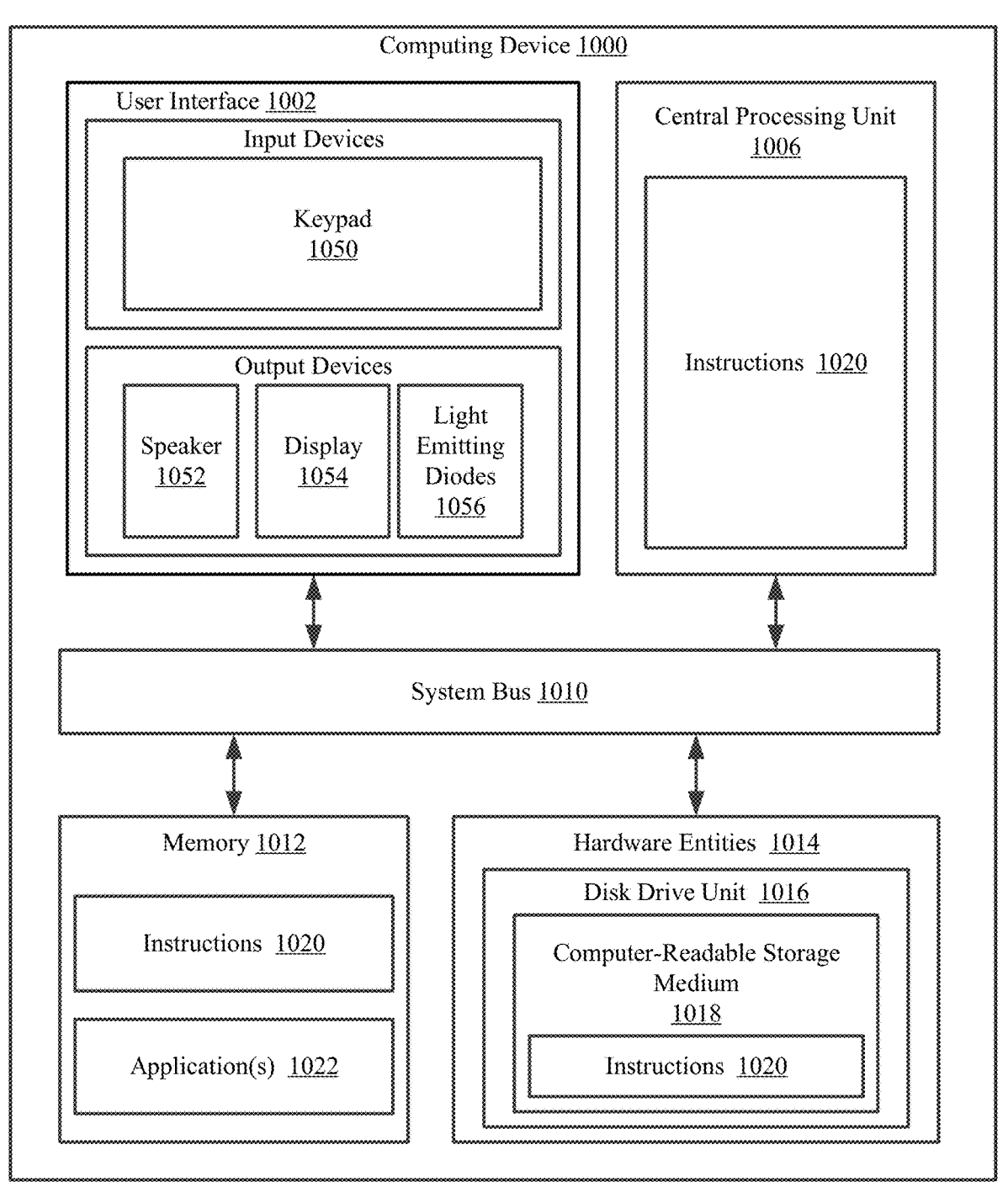
FIG. 10 provides an illustration of a computing device that can be used to build and/or customize cipher designs implementing the present solution.

Referring now to FIG. 10, there is provided a detailed block diagram of an illustrative architecture for a computing device 1000. The computing device 1000 is generally configured to allow a cryptographic algorithm to be built and/or customized. In this regard, the computing device 1000 implements a crypt development kit (e.g., crypto development kit 400 of FIG. 4).

The computing device 1000 may include more or less components than those shown in FIG. 10. However, the components shown are sufficient to disclose an illustrative embodiment implementing the present solution. The hardware architecture of FIG. 10 represents one embodiment of a representative server configured to facilitate building a cryptographic algorithm and/or customizing a permutation function $f$.

Some or all the components of the computing device 1000 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 10, the computing device 1000 comprises a user interface 1002, a CPU 1006, a system bus 1010, a memory 1012 connected to and accessible by other portions of computing device 1000 through system bus 1010, and hardware entities 1014 connected to system bus 1010.

The user interface can include input devices (e.g., a keypad 1050) and output devices (e.g., speaker 1052, a display 1054, and/or light emitting diodes 1056), which facilitate user-software interactions for controlling operations of the computing device 1000.

At least some of the hardware entities 1014 perform actions involving access to and use of memory 1012, which can be a RAM, a disk driver and/or a Compact Disc Read Only Memory ("CD-ROM"). Hardware entities 1014 can include a disk drive unit 1016 comprising a computer-readable storage medium 1018 on which is stored one or more sets of instructions 1020 (e.g., software code) configured to implement one or more of the methodologies, procedures, or functions described herein. The instructions 1020 can also reside, completely or at least partially, within the memory 1012 and/or within the CPU 1006 during execution thereof by the computing device 1000. The memory 1012 and the CPU 1006 also can constitute machine-readable media. The term "machine-readable media", as used here, refers to a single medium or multiple media (e.g., a centralized or distributed database, and/or associated caches and servers) that store the one or more sets of instructions 1020. The term "machine-readable media", as used here, also refers to any medium that is capable of storing, encoding or carrying a set of instructions 1020 for execution by the computing device 1000 and that cause the computing device 1000 to perform any one or more of the methodologies of the present disclosure.

In some scenarios, the hardware entities 1014 include an electronic circuit (e.g., a processor) programmed for facilitating the building of a cryptographic design for an FPGA implementation and/or customization of a cryptographic algorithm. In this regard, it should be understood that the electronic circuit can access and run a software application 1022 installed on the computing device 1000.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for providing and using a cryptographic algorithm with an S-box, comprising:
providing an electronic device with the cryptographic algorithm by implementing a plurality of layers of the S-box on a field programmable gate array of the electronic device, each of the layers comprises a substitution sublayer and a mixing sublayer;

using input data as an index for a lookup table implementing the S-box in the field programmable gate array to obtain a data item;
using the data item to obtain encrypted data; and
communicating the encrypted data in a message sent from the electronic device;
wherein the substitution sublayer comprises a plurality of μ-boxes that are each configured to perform a different randomly chosen non-linear bijective mapping from $GF(2^4)$ to $GF(2^4)$; and
wherein the mixing sublayer is configured to (i) compute a plurality of product terms each representing a product of an element of a maximum distance separable matrix M and an output from one of the plurality of μ-boxes, and (ii) compute a plurality of column vector elements each comprising a sum of respective ones of the plurality of product terms.

2. The method according to claim 1, wherein the S-box is configured to meet the following requirements: no fixed points where $S(x)=x$; and no opposite fixed points where $S(x)=$bitwise complement of x.

3. The method according to claim 1, wherein each of said μ-boxes is configured to meet the following requirements: no fixed points where $\mu(x)=x$; no opposite fixed points where $\mu(x)=$bitwise complement of x; maximum differential probability of 4/16 or smaller; and maximum absolute linear bias of 4/16 or smaller.

4. The method according to claim 1, wherein the plurality of μ-boxes comprises four or more μ-boxes with a 4-bit input and a 4-bit output.

5. The method according to claim 1, wherein the plurality of μ-boxes are each implemented via at least four look-up tables of the field programmable gate array.

6. The method according to claim 1, wherein the plurality of layers comprises four or more layers.

7. The method according to claim 1, wherein the plurality of product terms are computed by product operators that are each implemented via at least two lookup tables of the field programmable gate array.

8. The method according to claim 7, wherein each of the product operators is implemented via four or more lookup tables of the field programmable gate array.

9. The method according to claim 1, wherein each element of the maximum distance separable matrix M, the output of each of said μ-boxes, and each of said column vector elements comprises an element in a finite field $GF(2^4)/f(x)$, wherein $f(x)$ is a degree-4 irreducible polynomial.

10. The method according to claim 9, further comprising performing a plurality of rounds of the mixing sublayer using a different randomly chosen maximum distance separable matrix and a different randomly chosen irreducible polynomial.

11. A system, comprising:
a field programmable gate array comprising lookup tables implementing at least a portion of an encryption algorithm with an S-box;
the S-box configured to map input data to output data and comprising a plurality of layers implemented in the field programmable gate array, each of the layers comprises a substitution sublayer and a mixing sublayer; and
a communication device configured to communicate encrypted data in a message;
wherein the field programmable gate array uses the input data as an index for at least one of the lookup tables to retrieve a data item and uses the data item to obtain encrypted data;

wherein the substitution sublayer comprises a plurality of μ-boxes that are each configured to perform a different randomly chosen non-linear bijective mapping from $GF(2^4)$ to $GF(2^4)$; and wherein the mixing sublayer is configured to (i) compute a plurality of product terms each representing a product of an element of a maximum distance separable matrix M and an output from one of the plurality of μ-boxes, and (ii) compute a plurality of column vector elements each comprising a sum of respective ones of the plurality of product terms.

12. The system according to claim 11, wherein the S-box is configured to meet the following requirements: no fixed points where S(x)=x; and no opposite fixed points where S(x)=bitwise complement of x.

13. The system according to claim 11, wherein each of said μ-boxes is configured to meet the following requirements: no fixed points where μ(x)=x; no opposite fixed points where μ(x)=bitwise complement of x; maximum differential probability of 4/16 or smaller; and maximum absolute linear bias of 4/16 or smaller.

14. The system according to claim 11, wherein the plurality of μ-boxes comprises four or more μ-boxes with a 4-bit input and a 4-bit output.

15. The system according to claim 11, wherein the plurality of μ-boxes are each implemented via at least four look-up tables of the field programmable gate array.

16. The system according to claim 11, wherein the plurality of layers comprises four or more layers.

17. The system according to claim 11, wherein the plurality of product terms are computed by product operators that are each implemented via at least two lookup tables of the field programmable gate array.

18. The system according to claim 17, wherein each of the product operators is implemented via four or more lookup tables of the field programmable gate array.

19. The system according to claim 11, wherein each element of the maximum distance separable matrix M, the output of each of said μ-boxes, and each of said column vector elements comprises an element in a finite field $GF(2^4)/f(x)$, wherein $f(x)$ is a degree-4 irreducible polynomial.

20. The system according to claim 19, wherein each of a plurality of rounds of the mixing sublayer uses a different randomly chosen maximum distance separable matrix and a different randomly chosen irreducible polynomial.

* * * * *